April 18, 1939.  H. A. HICKS  2,154,569

VEHICLE WHEEL SUSPENSION

Filed July 12, 1934  2 Sheets-Sheet 1

INVENTOR.
Harold A. Hicks.
BY
Harness, Dind, Patee & Harris
ATTORNEYS.

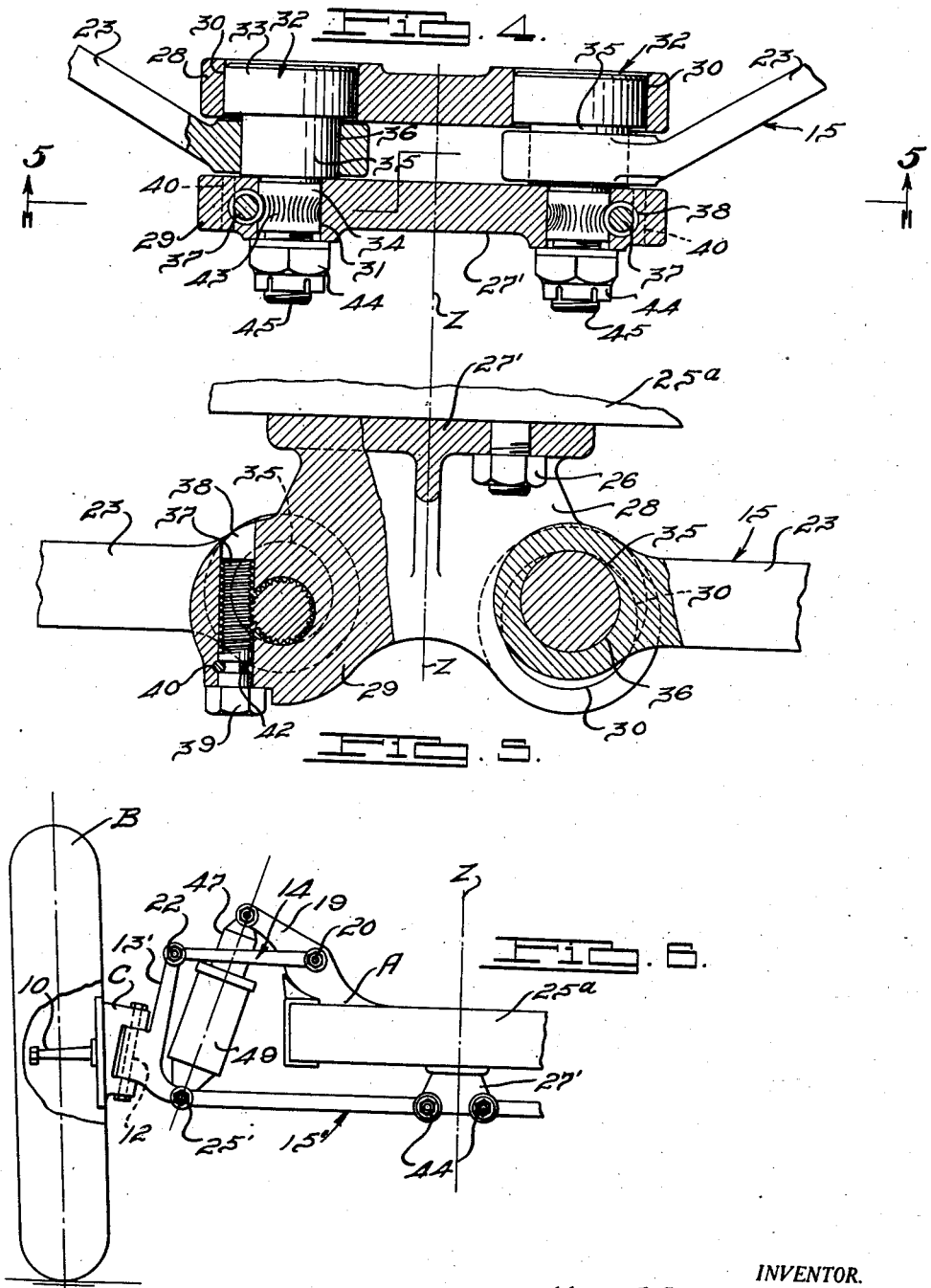

Patented Apr. 18, 1939

2,154,569

UNITED STATES PATENT OFFICE 2,154,569

VEHICLE WHEEL SUSPENSION

Harold A. Hicks, Detroit, Mich., assignor to Chrysler Corporation, Detroit, Mich., a corporation of Delaware Application July 12, 1934, Serial No. 734,735

3 Claims. (Cl. 280—96.2)

This invention relates to wheel suspensions for vehicles and refers more particularly to so-called independent wheel suspensions for motor vehicles.

In suspensions of the type mentioned above it is important to provide a predetermined desired wheel alignment and in connection with the steering wheels it is particularly desirable to maintain accuracy in the mounting of such wheels to provide the desired degree of camber and caster. Failure to maintain the aforesaid characteristics may, and often does, result in excessive tire wear, difficult steering, shimmy or tramp of the steering wheels, and other undesirable effects.

In actual production, difficulty has been experienced in maintaining the aforesaid characteristics in keeping with practical limitations of cost, workmanship, manufacturing tolerances, and the like.

It is an object of my invention to overcome the aforesaid undesirable effects and difficulties in an improved manner.

A further object of my invention resides in the provision of an improved wheel suspension particularly adapted for manufacture at relatively low cost.

A still further object of my invention resides in the provision of an improved suspension capable of manufacture in keeping with ordinary practical limitations of manufacturing tolerances.

Another object of my invention is to provide improved means for adjusting a vehicle steering wheel for caster or camber or both in an improved simplified manner without requiring disassembly of the suspension.

A still further object of my invention is to provide improved adjusting means for a vehicle ground wheel lessening heretofore existing complications, expense, and likelihood of failure by locating the adjusting means at a point or points where the forces are small and where relatively light weight and simply constructed adjusting means may be used. I preferably provide my adjusting means at the fulcrum point or points of the wheel displacement guiding means with the frame structure, and where the suspension includes upper and lower guide linkages I preferably provide my adjusting means in association with the pivotal support or fulcrum at the frame or the lower guide linkage.

An additional object of my invention is to provide an improved suspension for a motor vehicle ground wheel wherein the wheel displacement guiding means, preferably in the form of upper and lower links, have their pivotal supports with the frame arranged substantially parallel to the longitudinal central vertical plane of the vehicle for simplifying the mounting of the lower link and also for permitting the use of a single bracket for mounting the inner ends of the lower links of opposite ground wheels. Such novel arrangement further facilitates the control of wheel alignment and adjustment.

A further object of my invention resides in the provision of an improved load supporting spring arrangement adapted to more effectively take the forces due to the ground wheel striking a bump in the roadway ahead of the normal center of the wheel tire contact area on the ground.

Another object is to provide an improved spring suspension for independently sprung vehicle wheels wherein a greater margin of safety is provided with decreased tendency for periodic vibration.

A still further object of my invention resides in the provision of an improved yielding load supporting means and an energy absorbing means preferably in the form of a common structure housing one or more supporting springs and a hydraulic shock absorber device.

A still further object of my invention is to provide an independently sprung wheel having supporting spring means between the frame and a part of the wheel supporting structure arranged in such a manner that the wheel displacement guiding means is relieved of the frame load or the bending forces incident to wheel displacement.

Further objects and advantages of my invention will be apparent from the following detailed description, reference being had to the accompanying drawings in which I have shown several forms which my invention may assume by way of example and illustration.

In the drawings, in which like reference characters represent corresponding parts throughout the several views, Fig. 1 is a front elevation view of the forward vehicle steering wheels showing my improved suspension mechanism therefor.

Fig. 4 is an enlarged sectional plan view illustrating my wheel adjusting means, the section being taken along the line 4—4 of Fig. 1.

Fig. 5 is a sectional view of the adjusting means shown in Fig. 4, the section being taken along the line 5—5 of Fig. 4.

Fig. 6 is a front elevational view of a portion of a motor vehicle generally similar to the illustration in Fig. 1 but showing a modified form of my invention.

Figure 1:
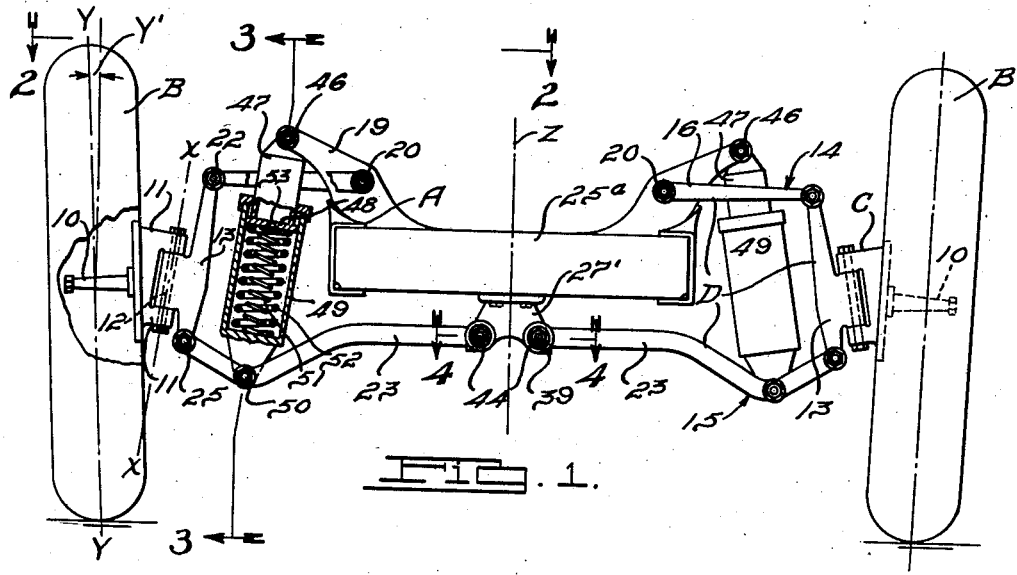

In the drawings, reference character A represents the frame or load carrying structure of the motor vehicle, the body, engine, and driving parts of the motor vehicle being omitted for clarity in my disclosure since such parts are well known in the art and may be of any desired form and arrangement.

I have illustrated my invention in connection with the forward steering ground wheels B of the motor vehicle although I desire to point out that my improved wheel suspension may be used for the rear ground wheels if desired. Each wheel B is journaled on a spindle 10 of the wheel supporting means C. This wheel supporting means of each of the wheels B is also formed with spaced bearings 11 for receiving a king-pin 12 providing swiveling of the steering wheel about the axis X—X of the king-pin or steering knuckle pivot.

As the parts associated with each of the wheels B are similar, the description for the most part will be limited to one of the wheels and parts associated therewith.

The wheels B, in their normal positions illustrated in Fig. 1, are preferably cambered so that the plane Y—Y of each wheel extends upwardly and outwardly at an inclination to the vertical, the camber angle being designated at Y' in Fig. 1. The desirability of camber for steering wheels is well known in the art.

Figure 2:
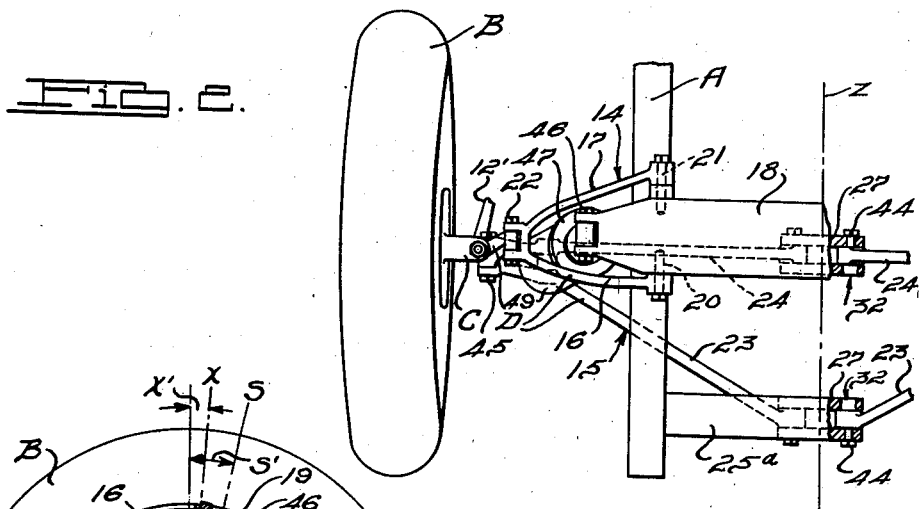
Fig. 2 is a top plan view of my wheel suspension, the view being taken as indicated by the line 2—2 of Fig. 1.
Figure 3:
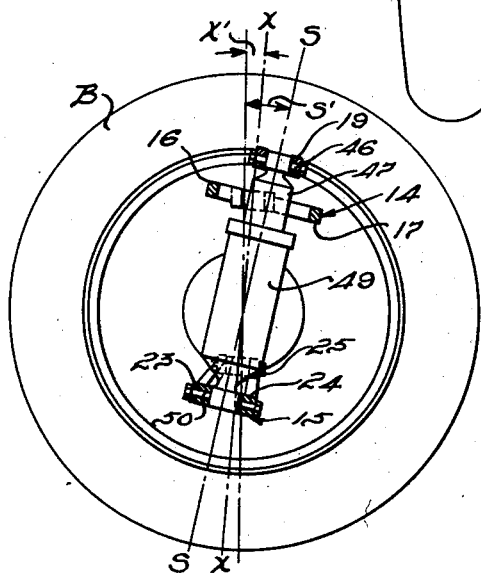
Fig. 3 is a sectional elevation view through the line 3—3 of Fig. 1.

The desirability for caster is also well understood in the art and in Fig. 3 the angle between the king-pin axis X—X and the vertical is known as the caster angle and is designated at X', it being noted that as viewed in Fig. 3 the axis X—X of the king-pin 12 is inclined upwardly and rearwardly. The wheels B are swiveled for steering purposes about their respective king-pins 12 in any well-known manner, a portion of one of the steering arms being designated at 12' in Fig. 2.

In order to support the frame structure A by the wheels B and to provide substantially independent suspension for springing movement of each of the wheels relative to the other, I have provided the connecting means or wheel displacement guiding means D intermediate the frame and the wheel supporting means C. This connecting means includes an arm or steering knuckle bracket 13 associated with each of the wheels B, each arm being adapted to support or carry a king-pin 12 by reason of the bearing portion thereof which lies between the spaced bearings 11.

Arm 13 extends generally vertically in the sense that the ends thereof are positioned in spaced relation, the connecting means D in the illustrated embodiments of my invention being arranged in a substantially trapezoidal shape. Thus, during a displacement of a wheel or wheels, the track between the wheels B remains substantially unchanged when either wheel strikes a depression or encounters a bump in the roadway. The linkage or connecting means D, while of the general parallelogram type, is preferably arranged in the form of a quadrilateral and more particularly in the form of a trapezoid defined by various supports for the linkage parts which will presently be more apparent.

Extending generally laterally or transversely of the vehicle are the upper and lower linkages or connectors 14 and 15 respectively, these connectors being of the so-called wishbone type or generally V-shaped. Where the aforesaid trapezoidal arrangement of linkage is desired, connector 15 is somewhat longer than connector 14, as illustrated, this arrangement deviating somewhat from a true parallelogram but providing substantially vertically guided movement of the point of wheel tread contact with the ground on displacement of the wheel. Connector 14 has its arms 16 and 17 thereof diverging inwardly toward frame A for pivotal connection therewith in an improved manner. To this end the frame A includes a cross member 18 having the upwardly and outwardly extending bracket portions 19 thereof at oposite sides of the frame. The inner ends of the arms 16 and 17 are respectively pivotally supported by an associated bracket 19 by reason of the pivot pins 20 and 21 best shown in Fig. 2. An axis through the pivots 20 and 21 is preferably arranged to lie parallel to the longitudinal central vertical plane of the vehicle designated as Z throughout the several views. At their outer ends the arms 16 and 17 converge for pivotal connection at 22 with the upper end of the arm 13.

Connector 15 is also illustrated as the wishbone type generally similar in form to the upper connector 14. Thus, the lower connector 15 is likewise formed with the inwardly diverging arms 23 and 24 having their outer converged portion pivotally connected at 25 with the lower end of an arm 13, the inwardly converging ends of these arms being adapted for adjustable pivotal connection to the frame structure A in an improved manner.

In order to provide improved clearance for the engine (not shown) and also to obtain other beneficial results, the arm 24 extends inwardly substantially perpendicular to the plane Z while the arm 23, although preferably lying in a plane common to the arm 24, extends inwardly and forwardly of the vehicle to a point adjacent the plane Z where the frame structure A is provided with a second cross member 25ᵃ.

Inasmuch as the mounting for the inner ends of the arms 23 and 24 of the lower connector 15 is identical, only one of these mountings will be described in detail, reference being had particularly to Figs. 4 and 5.

Secured to and beneath the cross member 18, preferably at the plane Z by reason of suitable fasteners 26, is a bracket 27 adapted to adjustably and pivotally support the inner ends of the link arms 24 of the pair of opposite wheels B. A similar bracket 27' is secured to the cross member 25ᵃ for adjustably and pivotally supporting the adjacent inner ends of the forwardly extending arms 23 of the lower connectors 15 associated with the front wheels B.

Each of the brackets 27 and 27' is formed with the transversely extending longitudinally spaced downwardly depending brackets ears 28 and 29 formed with pairs of concentric openings 30 and 31, the axis of each of these pairs of openings lying parallel to the plane Z and the openings 30 being relatively larger than the openings 31 as shown in Fig. 4.

Adjustably journaled for rotation in each pair of openings 30 and 31 is an eccentric adjusting member 32 formed with a cylindrical end bearing 33 journaled in an opening 30, a second bearing portion 34 of reduced diameter, and an intermediate cylindrical portion 35 having its axis eccentrically positioned with respect to the common axis of the openings 30 and 31 as best shown in Fig. 5. The inner end of each of the arms 23 is formed with an opening 36 receiving one of the eccentrics 35, each arm 23 being thereby swinging or pivotally fulcrumed or supported by one of the adjusting members 32 adjacent the aforesaid plane Z.

Suitable means is provided for rotatably adjusting each of the elements 32 and in Figs. 4 and 5 I have illustrated this adjusting means in the form of a threaded element 37 manually rotatable in the bore 38 by the head 39, a pin 40 engaging a circular groove 42 in the element 37 for holding the adjustable element 37 against axial movement while permitting rotative adjustment thereof. The reduced portion 34 of each member 32 has a worm wheel 43 formed around its circumference meshing with the teeth of the adjusting element 37 whereby rotative adjustment of the member 32 may be accomplished by manual rotative adjustment of the head 39 of an adjusting element 37.

If desired, each of the adjusting members 32 may be additionally locked in any position of adjustment thereof by reason of the lock nut 44 threadedly engaging a stem 45 carried by the reduced bearing portion 34 of each adjustable member 32 as best shown in Fig. 4.

Referring now to Figs. 1, 2 and 3, I have provided improved means for yieldingly supporting the frame structure A together with the load carried thereby, and, as a further feature of my invention, my yielding load supporting means is preferably also combined with means for absorbing or damping the vibration or relative displacement between the ground wheels B and the frame structure A. More particularly, according to the present embodiment of my invention, each frame bracket 19 projects outwardly to a point substantially midway between the pivot points for the upper connector 14 to provide a pivotal connection at 46 for the plunger 47. The plunger 47 is hollow and has its lower end 48 slidable in telescopic fashion within a lower cylinder 49 pivotally connected at 50 to the arms 23 and 24 of a lower connector 15 as best shown in Figs. 1 and 3.

Enclosed within the cylinder 49 and acting between the bottom of the cylinder and the end 48 of plunger 47 I have provided the yielding load supporting means preferably in the form of inner and outer coil springs 51 and 52, this double spring providing an improved margin of safety with lessened tendency for periodic vibration. The double spring also affords greater force absorption for a given space than could be obtained by the use of a single coil spring.

The plunger 47 and cylinder 49 are arranged to provide a two-way hydraulic shock absorber for checking and dampening relative movement between each wheel B and the frame structure A, the cylinder 49 being adapted to receive a quantity of suitable fluid such as oil commonly used in hydraulic shock absorbers. The plunger end 49 is provided with an orifice 53 suitably proportioned to restrictedly by-pass the oil back and forth between plunger 47 and cylinder 49 for relative displacements between wheel B and frame A. The static load is thus taken by the springs 51 and 52 and any shock or upward motion of the wheel B is resisted by the springs and the shearing of the oil as it passes through the orifice 53. On the return stroke the springs force the plunger 47 upwardly and thus operate against the oil which must flow back through the orifice 53 to the cylinder 49. In this manner I have combined in a single unit the load supporting spring means and the shock absorber means and I have furthermore positioned the unit for increased effectiveness in the operation thereof.

By locating the springs 51 and 52 and the shock dissipator associated therewith as near to the center of the wheel B as can be done conveniently, I have minimized the size and weight of these structures since the forces dealt with are relatively small at such points of location.

I have also provided for elimination of the rearward component of the resultant force due to striking a bump ahead of the normal center of the wheel tire contact area of the ground by arranging the axis S—S at an angle S' with the vertical and, as illustrated in Fig 3, the angle S' is relatively great in comparison to the caster angle X'. The axis S—S inclines upwardly and rearwardly in the direction of the king-pin axis X—X and while ordinarily the caster angle X' is in the neighborhood of 3° the angle S' of the springs 51 and 52 is preferably in the neighborhood of approximately 12°.

In operation of my wheel suspension it will be apparent that as either of the wheels B rotates about the associated spindle 10, such wheel is displaceable independently of the other wheel and relative to the frame structure A. On displacement of one of the wheels B, the arm 13 and wheel supporting means C is vertically displaced with the wheel, the guided vertical swinging movement of the wheel being brought about by the upper and lower connectors 14 and 15 swinging on the pivots provided by these connectors with arm 13, frame structure A, and the relatively stationary eccentrics 35 for the inner ends of the arms 23 and 24 of the lower connector 15. The springs 51 and 52 yieldingly support the vehicle load and the plunger 47 and cylinder 49 cooperate to provide a hydraulic shock absorber means for the wheel displacement as aforesaid.

Assuming now that it is desired to alter the camber angle Y', it will be apparent that this adjustment may be accomplished by releasing the lock nuts 44 associated with the adjusting members 32 of the arms 23 and 24 of a lower connector 15 associated with the wheel to be adjusted. By rotatably adjusting the heads 39 of the elements 37 the eccentrics 35 may be rotated laterally of the vehicle either inwardly or outwardly to bodily shift the lower connector 15 either inwardly or outwardly depending on whether it is desired to increase or decrease the camber angle Y' as will be readily understood. During this adjusting movement for the lower connector 15 it will be apparent that the position of the arm 13 associated therewith will be slightly changed, the adjustment thereof being readily accommodated by the pivots 22 and 25 at the upper and lower ends of the arm. It will furthermore be apparent that the plunger 47 and cylinder 49 will also readily accommodate itself to the lateral shifting movement of the lower connector 15 and when the camber angle Y' has been adjusted as desired the lock nuts 44 are again tightened to hold the respective adjusting members 32 securely in the associated brackets 27 or 27'. As shown in Fig. 5 the eccentrics 35 are preferably normally extended upwardly (or downwardly) so that the eccentrics will be most effective for lateral adjustment of the lower connector 15 as will be readily understood.

Assuming that it is desired to alter the caster angle X' of any wheel B, it will be apparent that this may be accomplished by causing a forward or rearward shifting movement of the lower end of the arm 13 with respect to its upper end depending on whether it is desired to increase or decrease the caster angle. Such swinging movement of the arm 13 is readily brought about either by a rotative adjustment of only one of the eccentrics 35 associated with a lower connector 15 or else more effectively by adjusting one eccentric 35 in one direction and the other eccentric in the opposite direction, the upper connector 14 yieldingly springing sufficiently to permit this adjustment. Thus the arms 16 and 17 of the upper connector 14 are adapted to be slightly distorted when an adjustment of the aforesaid character is made although, if desired, the pivotal points for the upper connector may be of such construction to permit this adjustment without the aforesaid springing thereof. The necessary adjustment for variation of the caster angle is ordinarily relatively small and I therefore prefer, in the interests of simplicity and economy, to arrange the parts for operation substantially as described.

I have not illustrated my suspension and adjusting means for the rear driving wheels of the vehicle as such parts may be of any desired well-known form, or they may be suspended according to the teachings of my invention. In the latter instance, the king-pins and swiveling structure of the front wheels will ordinarily be omitted as will be readily understood. Furthermore, if desired, my adjusting means or the equivalent thereof may be associated with the inner pivotal points for the upper connectors 14 either in combination with the adjusting means illustrated for the lower connectors 15 or in lieu thereof.

I have furthermore not shown nor described the steering or braking mechanism of the wheels as such devices are well known in the art and form no part per se of this invention.

As a further means of even more effectively locating the yielding springing means for supporting the vehicle frame structure and also for the shock absorber means where it is desired to employ these devices in combination according to the teachings of my invention, I have illustrated a slightly modified form of my invention in Fig. 6 of the drawings. In general the parts are identical to the Fig. 1 embodiment as will be noted by the similar reference characters although in Fig. 6 the arm 13' has its lower pivot 25' receiving, not only the arms of the lower connector 15', but in addition thereto the lower pivoted end of the aforesaid cylinder 49. In this manner the lower connector 15' is relieved of bending inasmuch as the frame loads are transmitted directly to the wheel B through the intermediary of the arm 13' and as a consequence thereof the connector 15' may be made relatively light and the loads are furthermore more effectively transmitted between the frame and wheel as hereinbefore referred to. This arrangement has the further advantage of directing the spring thrust directly to the pivot 25' avoiding eccentric loadings on the members of the linkage system and providing for location of the coil spring thrust as closely as practicable to the center of the wheel B. Such arrangement minimizes the forces of the spring and minimizes the weight of the members of the linkage system.

I desire to point out that various modifications and changes will be apparent from the teachings of my invention and I do not limit my invention in its broader aspects to the particular combination and arrangement of parts which I have shown by way of example.

What I claim is:

1. In a suspension for a dirigible ground wheel of a motor vehicle having a frame structure, relatively swivelled members for supporting said wheel for steering action, a king pin swivelling said members, said king pin having its axis inclined upwardly and rearwardly to provide an angle of caster for the wheel, wheel displacement guiding means including a member intermediate said frame structure and one of said swivelled members, and a coil spring acting between said frame structure and one of the members aforesaid, the axis of said coil spring being inclined upwardly and rearwardly to provide an angle between said king pin axis and said spring axis substantially greater than said caster angle.

2. In a suspension for a ground wheel of a motor vehicle having a frame structure, wheel supporting and guiding means between said wheel and frame structure for accommodating rising and falling movements of said wheel independently of the remaining wheels of the vehicle, means connecting said supporting and guiding means to said frame structure for swinging movement relative thereto about a predetermined longitudinally extending axis but preventing relative displacement between said frame structure and said supporting and guiding means along said axis during travel of the vehicle, and a coil spring between said frame structure and said supporting and guiding means for yieldingly supporting said frame structure, the axis of said coil spring being inclined downwardly and forwardly in the direction of forward vehicle travel and being so constructed and arranged as to minimize the rearward component of the resultant force acting on said supporting and guiding means due to the wheel striking a bump ahead of the normal center of the wheel contact area of the ground, said wheel supporting and guiding means including a king pin for steerably swivelling said wheel, said king pin being inclined downwardly and forwardly substantially less than the inclination of the coil spring.

3. In a suspension for a steering ground wheel of a motor vehicle, wheel supporting means, wheel displacement guiding means, a rotatable eccentric adjusting element adapted to act on one of said means for adjusting the normal position of said wheel, and a manually operable element disposed generally transversely with respect to the axis of rotation of the eccentric and operably connected therewith for imparting adjusting rotation thereof.

HAROLD A. HICKS.